US011898555B2

(12) United States Patent
Yamabe

(10) Patent No.: US 11,898,555 B2
(45) Date of Patent: Feb. 13, 2024

(54) PLUNGER PUMP, LIQUID FEEDING DEVICE, AND LIQUID CHROMATOGRAPHY DEVICE

(71) Applicant: KYOCERA Corporation, Kyoto (JP)

(72) Inventor: Kunihiro Yamabe, Higashiomi (JP)

(73) Assignee: KYOCERA CORPORATION, Kyoto (JP)

(*) Notice: Subject to any disclaimer, the term of this patent is extended or adjusted under 35 U.S.C. 154(b) by 238 days.

(21) Appl. No.: 17/426,413

(22) PCT Filed: Jan. 29, 2020

(86) PCT No.: PCT/JP2020/003143

§ 371 (c)(1),
(2) Date: Jul. 28, 2021

(87) PCT Pub. No.: WO2020/158791

PCT Pub. Date: Aug. 6, 2020

(65) Prior Publication Data

US 2022/0099074 A1 Mar. 31, 2022

(30) Foreign Application Priority Data

Jan. 31, 2019 (JP) ................................ 2019-015783

(51) Int. Cl.
*F04B 7/06* (2006.01)
*F04B 53/14* (2006.01)
(Continued)

(52) U.S. Cl.
CPC ................ *F04B 7/06* (2013.01); *F04B 53/14* (2013.01); *F04B 7/0046* (2013.01); *F04B 7/0053* (2013.01); *F04B 9/042* (2013.01); *F04B 19/22* (2013.01); *F04B 23/06* (2013.01); *F04B 53/162* (2013.01); *F05C 2203/0869* (2013.01); *F05C 2203/0895* (2013.01); *F05C 2253/24* (2013.01)

(58) Field of Classification Search
CPC .. F04B 7/06; F04B 53/14; F04B 53/16; F04B 7/0046; F04B 7/0053; F04B 7/04;
(Continued)

(56) References Cited

U.S. PATENT DOCUMENTS 4,625,572 A * 12/1986 Yamashita ......... G01N 35/1083 92/170.1
5,279,210 A * 1/1994 Pinkerton ................. F04B 7/06 92/170.1
(Continued)

FOREIGN PATENT DOCUMENTS

CN 207906006 U 9/2018
DE 4102666 * 1/1992 ............ C04B 35/111
(Continued)

OTHER PUBLICATIONS

JP2004352573 translation (Year: 2023).*
(Continued)

*Primary Examiner* — Kenneth J Hansen
*Assistant Examiner* — David N Brandt
(74) *Attorney, Agent, or Firm* — Procopio, Cory, Hargreaves & Savitch LLP

(57) ABSTRACT

A plunger pump includes a cylinder having a cylinder chamber, and a first through hole and a second through hole that open from an inner circumferential surface toward an outer circumferential surface of the cylinder chamber, and a plunger inserted in the cylinder chamber and configured to make a reciprocating motion with respect to the cylinder chamber. An inner circumferential portion of the cylinder has an inner circumferential surface, and a helical first groove portion on the inner circumferential surface, the helical first groove portion being configured to communicate with at least one of the first through hole and the second through hole.

16 Claims, 11 Drawing Sheets

(51) Int. Cl.

| | |
|---|---|
| ***F04B 9/04*** | (2006.01) |
| ***F04B 19/22*** | (2006.01) |
| ***F04B 23/06*** | (2006.01) |
| ***F04B 53/16*** | (2006.01) |
| ***F04B 7/00*** | (2006.01) |

(58) Field of Classification Search
CPC .......... F04B 9/042; F04B 19/22; F04B 23/06; F04B 53/162; F05C 2203/0869; F05C 2203/0895; F05C 2253/24
See application file for complete search history.

(56) References Cited

U.S. PATENT DOCUMENTS

| | | | | |
|---|---|---|---|---|
| 9,261,085 | B2 | 2/2016 | Middleton et al. | |
| 2004/0241023 | A1 | 12/2004 | Pinkerton, III et al. | |
| 2012/0291531 | A1* | 11/2012 | Akieda | G01N 30/34 73/61.55 |
| 2017/0218950 | A1* | 8/2017 | Mizukoshi | F04B 53/162 |
| 2019/0101107 | A1 | 4/2019 | Mizukoshi | |

FOREIGN PATENT DOCUMENTS

| | | | | | |
|---|---|---|---|---|---|
| DE | 19528618 | A1 * | 2/1997 | F04B 7/06 |
| JP | 2004352573 | * | 12/2004 | C04B 35/10 |
| JP | 2007-502939 | A | 2/2007 | |
| JP | 5128415 | B2 | 1/2013 | |
| JP | 5981669 | B1 | 8/2016 | |
| WO | WO-2005005340 | A1 * | 1/2005 | C04B 35/6455 |
| WO | 2011/090188 | A1 | 7/2011 | |

OTHER PUBLICATIONS

Ceramic—Wikipedia pdf from en.wikipedia.org/wiki/Ceramic (Year: 2023).*
DE19528618 translation (Year: 2023).*

* cited by examiner

PLUNGER PUMP, LIQUID FEEDING DEVICE, AND LIQUID CHROMATOGRAPHY DEVICE

TECHNICAL FIELD

The present disclosure relates to a plunger pump for transferring fluids such as dialysis fluid used in hemodialysis treatment, for example, and solvents used in liquid chromatography, a liquid feeding device that uses the plunger pump, and liquid chromatography device.

BACKGROUND ART

In a plunger pump, a plunger moves back and forth in a cylinder chamber in a reciprocating motion to alternately take in fluid through an intake port provided in the cylinder and discharge fluid from a discharge port provided in the cylinder.

FIGS. 11(*a*) to 11(*e*) illustrate a normal plunger pump operation. At the starting point (FIG. 11(*a*)) a notch portion 104 at a front end portion of a plunger 101 is located near an intake port 102 of a cylinder 100, and the intake port 102 is closed by the plunger 101. From this state, when the plunger 101 is raised while rotating within a cylinder chamber (FIG. 11(*b*)), the notch portion 104 passes through the intake port 102, fluid is taken into the cylinder 100 through the intake port 102, and suction is completed (FIG. 11(*c*)). Then, when the plunger 101 is lowered while rotating, the fluid is discharged through a discharge port 103 (FIGS. 11(*d*) and (*e*)). As soon as the discharge is completed, the plunger 101 is raised in the cylinder chamber while rotating, and the operations in FIGS. 11(*a*) to (*e*) are repeated.

When transporting the fluid with such a plunger pump, the fluid may enter a gap between the plunger and cylinder, and this fluid may leak to the outside of the pump due to the reciprocating motion of the plunger in the cylinder. If the fluid is sticky liquid, slightly leaked sticky liquid will dry out when exposed to air and crystallize on a surface of the plunger. Crystals thus generated may enter into the pump and hinder operation of the pump.

In view of this, Patent Document 1 proposes a solution to prevent the liquid that has entered between the plunger and the cylinder from drying. Specifically, an outer circumferential surface of the plunger positioned away from the notch portion described above is provided with a groove serving as a liquid retaining space. The groove is formed over the entire circumference of the plunger in the circumferential direction.

Patent Document 2 proposes a plunger pump with improved sealing performance by using a resin material having a lower hardness than a cylinder portion in part of the cylinder.

CITATION LIST

Patent Document

Patent Document 1: JP 5128415 B
Patent Document 2: JP 5981669 B

SUMMARY

A first plunger pump according to the present disclosure includes a cylinder having a cylinder chamber, and a first through hole and a second through hole that open from an inner circumferential surface toward an outer circumferential surface of the cylinder chamber; and a plunger inserted in the cylinder chamber and configured to make a reciprocating motion with respect to the cylinder chamber. An inner circumferential portion of the cylinder has an inner circumferential surface, and a helical first groove portion on the inner circumferential surface, the helical first groove portion being configured to communicate with at least one of the first through hole and the second through hole.

A second plunger pump according to the present disclosure includes: a cylinder having a cylinder chamber, and a first through hole and a second through hole that open on an inner circumferential surface and an outer circumferential surface of the cylinder chamber; and a plunger that has a front end portion with an outer circumferential surface provided with a notch portion, that is inserted in the cylinder chamber, and that is configured to make a reciprocating motion with respect to the cylinder chamber. An outer circumferential portion of the plunger has an outer circumferential surface, and a helical first groove portion on the outer circumferential surface, the helical first groove portion being configured to communicate with at least one of the first through hole and the second through hole.

A liquid feeding device according to the present disclosure includes the above-described plunger pump and a driver that causes the plunger in the plunger pump to make a reciprocating motion.

Liquid chromatography device according to the present disclosure includes the above-described liquid feeding device.

DESCRIPTION OF EMBODIMENTS

First Embodiment

Figure 1:
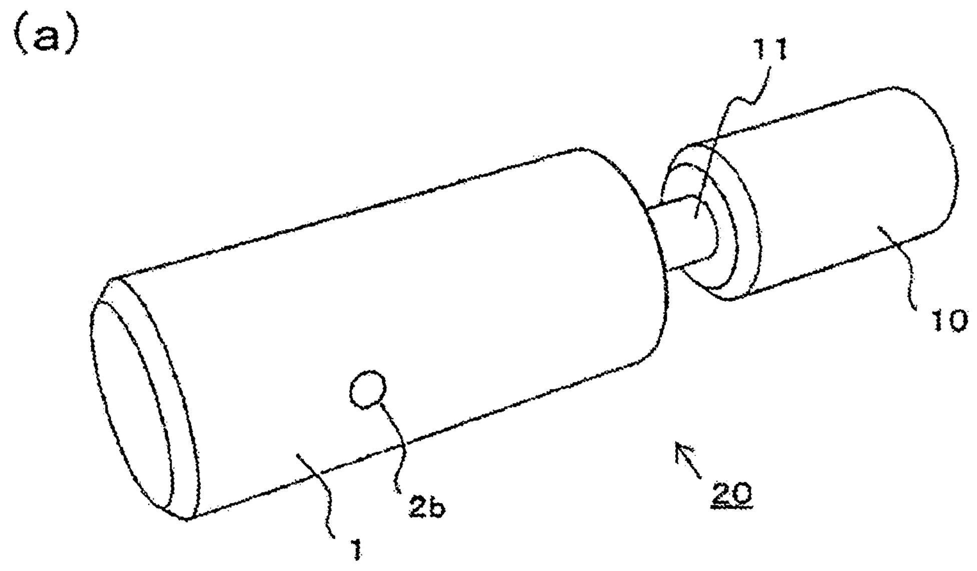
FIG. 1(*a*) is a perspective view illustrating a plunger pump according to a first embodiment of the present disclosure, and FIG. 1(*b*) is a longitudinal sectional view thereof.
Figure 1:
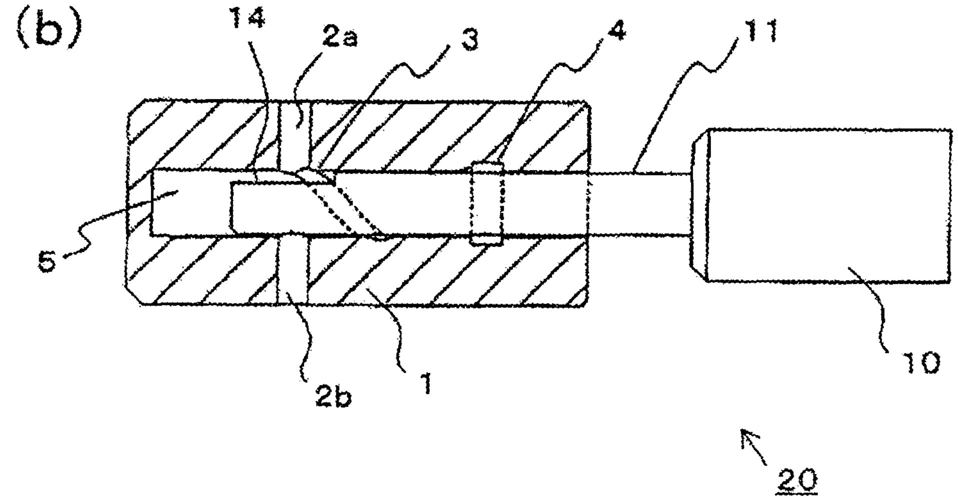

A plunger pump according to a first embodiment of the present disclosure will be described based on FIGS. 1 to 3. As illustrated in FIGS. 1(*a*) and 1(*b*), a plunger pump 20 includes a cylinder 1 having a cylinder chamber 5, and a plunger 11 that is slidably inserted into the cylinder chamber 5 of the cylinder 1.

The cylinder 1 has an intake port 2*a* (first through hole) and a discharge port 2*b* (second through hole) leading to the cylinder chamber 5 near a bottom portion of the cylinder chamber 5. The intake port 2*a* and the discharge port 2*b* are provided at positions facing each other via an axial center of the cylinder 1.

Figure 2:
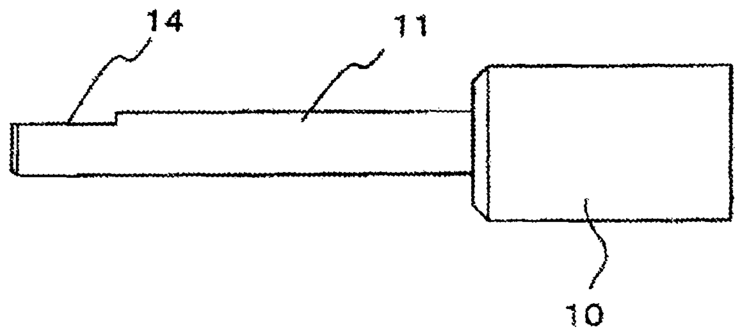
FIG. 2 is a side view illustrating the plunger according to the first embodiment.

The plunger 11 has a front end portion with an outer circumferential surface provided with a notch portion 14 (see FIG. 2). Therefore, by causing the plunger 11 to reciprocate while rotating the plunger 11 with respect to the cylinder 1 (hereinafter, may be referred to as rotary reciprocating motion), the notch portion 14 alternately communicates with the intake port 2*a* and the discharge port 2*b*. Thus, fluid can be transported with an operation similar to that illustrated in FIG. 9. The plunger 11 has a rear end portion provided with an attachment portion 10 for causing the plunger 11 to make the rotary reciprocating motion.

As illustrated in FIG. 1(*b*), the cylinder 1 has an inner circumferential surface provided with a helical groove 3 (first groove portion) that has a front end communicating with the intake port 2*a* and extends from the intake port 2*a* toward the rear end side. As illustrated in FIGS. 3(*a*) and 3(*b*), the helical groove 3 has such a length as to make a single turn, that is, 360° along the inner circumferential surface of the cylinder 1. The helical groove 3 has a rear end communicating with a circumferential groove 4 (second groove portion) formed over the entire circumference of the inner circumferential surface of the cylinder 1 along the circumferential direction.

With the inner circumferential surface of the cylinder 1 thus provided with the helical groove 3 communicating with the intake port 2*a*, some of the fluid transported from the intake port 2*a* enters the helical groove 3 so that the fluid constantly enters a gap between the cylinder 1 and the plunger 11 from the helical groove 3, whereby the fluid can be prevented from adhering without newly using a cleanser.

The helical groove 3 is less likely to form a boundary with other portions in the rotary reciprocating motion, whereby crystallization and deposition of adhesive liquid as the fluid can be suppressed. When the plunger 11 is made of a ceramic, the crystal grains and the grain boundary phase can be suppressed from falling off at an edge portion of the helical groove 3.

Note that the front end of the helical groove 3 may be in communication with the discharge port 2*b* instead of the intake port 2*a*, and two helical grooves 3 may be arranged side by side and have their front ends respectively communicating with the intake port 2*a* and the discharge port 2*b*.

Figure 3:
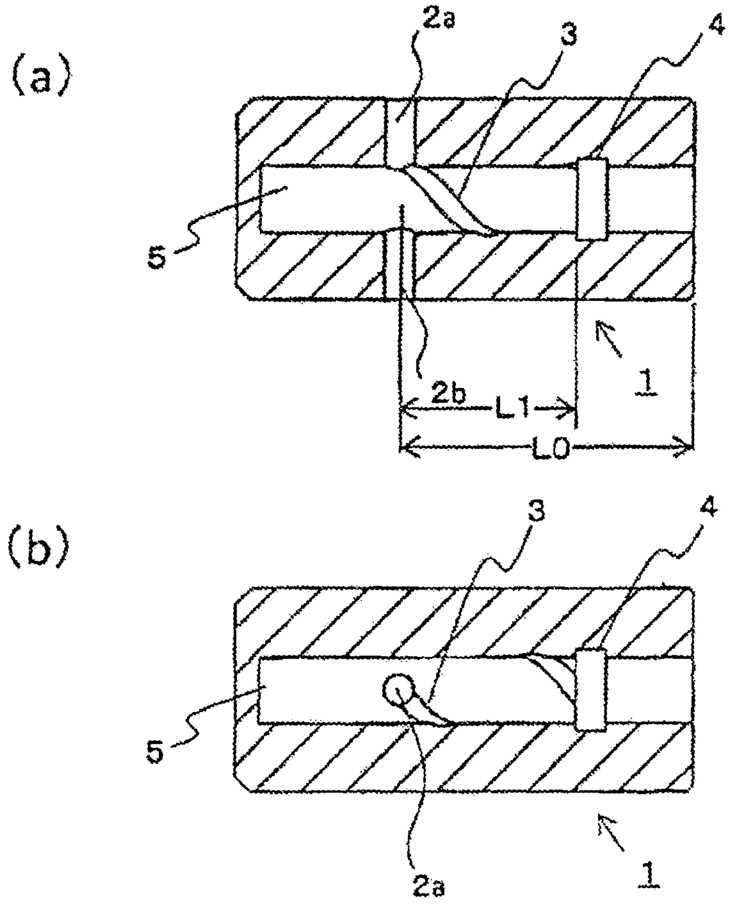
FIG. 3(*a*) is a longitudinal sectional view of a cylinder according to the first embodiment, and FIG. 3(*b*) is a longitudinal sectional view of the cylinder rotated 90° from the state in FIG. 3(*a*).

The length of the helical groove 3 along the axial direction of the cylinder 1, that is, a length L1 illustrated in FIG. 3(*a*), may be from 30% to 80%, and preferably from 40% to 60% of a length L0 from the front end of the helical groove 3 to the rear end of the cylinder 1. As long as the length is in this range, the helical groove 3 may form a half turn (i.e., 180°) or make a plurality of turns. For the sake of processing accuracy and prevention of adherence of the fluid, the helical groove 3 preferably makes a ⅓ turn or more and two turns or less.

Figure 10:
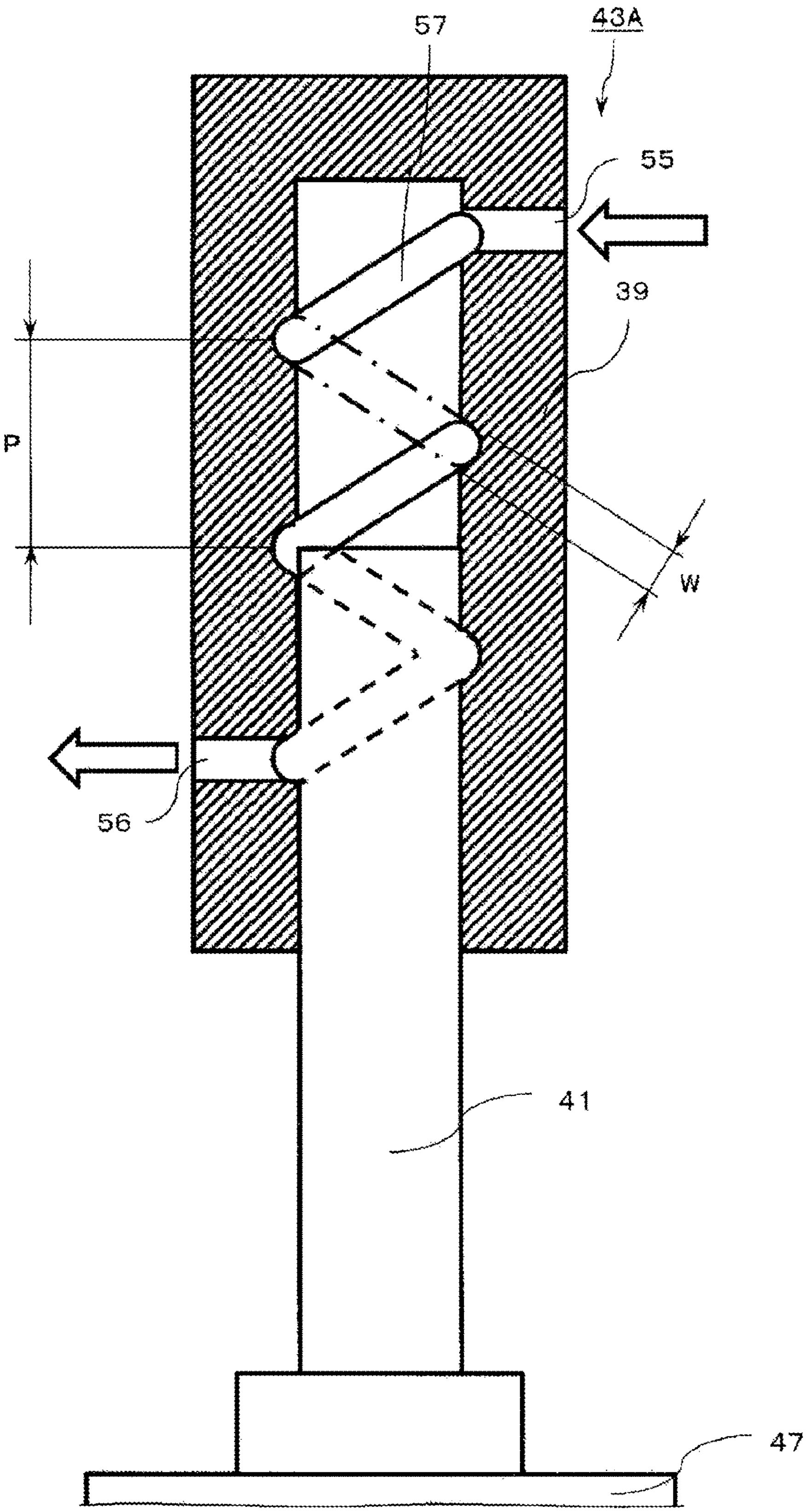
FIG. 10 is a longitudinal sectional view of a first cylinder illustrated in FIG. 9.
Figure 11:
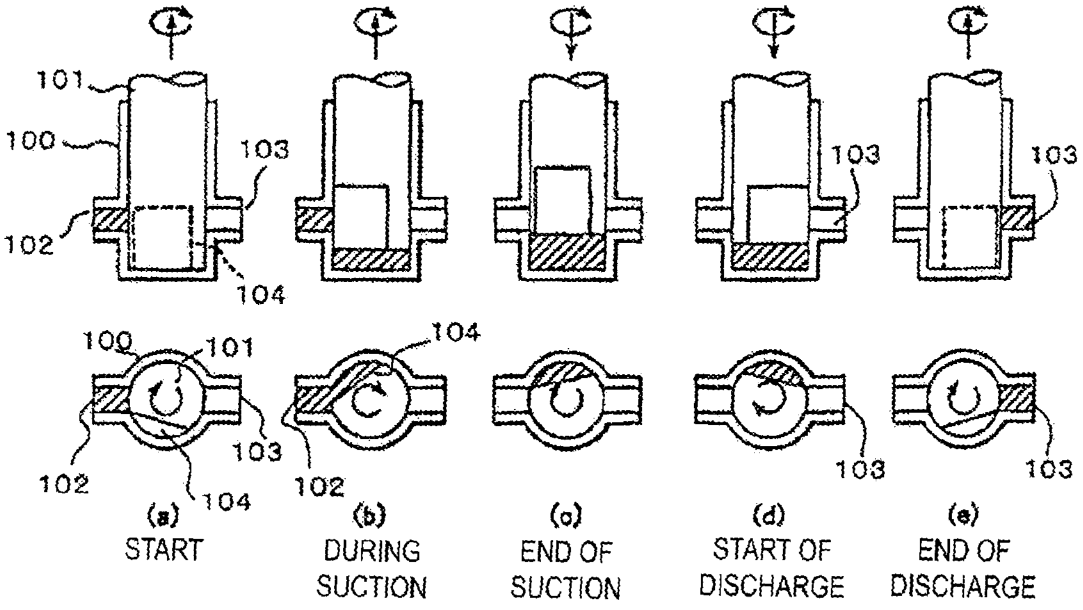
FIGS. 11(*a*) to 11(*e*) are explanatory diagrams illustrating operations of a plunger pump.

A pitch (interval) P of the helical groove 3 in the axial direction is preferably three times or more and 20 times or less a width W of the helical groove 3 (see FIG. 10).

The inner circumferential surface forming at least any of the intake port 2*a*, the discharge port 2*b*, and the helical groove 3 may be a fired surface. If the inner circumferential surface is a fired surface, since there is no fractured layer caused by polishing or grinding, it is difficult for degranulation to occur even when a high-pressure fluid flows therethrough.

With the rear end of the helical groove 3 communicating with the circumferential groove 4, the fluid can be reserved and retained on the inner circumferential surface of the cylinder 1, whereby a dry state due to the absence of the fluid in the gap between the cylinder 1 and the plunger 11 can be avoided. In this context, the circumferential groove 4 needs to be in communication with the helical groove 3. When the circumferential groove 4 is separate from the helical groove 3, the fluid is supplied only from the gap between the cylinder 1 and the plunger 11 and thus is less likely to be retained.

The width of the circumferential groove 4 is not particularly limited. The circumferential groove 4 may or may not be entirely or partially exposed from the rear end of the cylinder 1 during the reciprocating motion of the plunger 11. The depths of the helical groove 3 and the circumferential groove 4 may be the same or different as long as the depths are sufficient for retaining the fluid. The depth may be generally in a range from 0.1 mm to 3 mm, and preferably is in a range from 0.5 mm to 1 mm. Retention of the fluid used is facilitated with a depth within such ranges.

The inner circumferential surface forming the circumferential groove 4 includes a first side surface and a second side surface opposite to each other, and a bottom surface connecting the first side surface and the second side surface to each other. The maximum grain size of the crystal grains on the first side surface and the second side surface is preferably smaller than the maximum grain size of the crystal grains on the bottom surface.

With such a configuration, degranulation from the first side surface and the second side surface is less likely to occur. Furthermore, since compressive strength on the first side surface and the second side surface is high, cracks are unlikely to occur even when the plunger 11 repeatedly comes into sliding contact with the cylinder 1, whereby use over an extended period of time is possible.

A difference between the maximum grain size of the crystal grains on the first side surface and the second side surface and the maximum grain size of the crystal grains on the bottom surface is preferably 0.2 μm or more.

With such a configuration, degranulation from the first side surface and the second side surface is even less likely to occur. Furthermore, since compressive strength on the first side surface and the second side surface is high, cracks are even less likely to occur even when the plunger 11 repeatedly comes into sliding contact with the cylinder 1, whereby use over an extended period of time is possible.

Compared with the bottom surface, the first side surface and the second side surface preferably feature a small cut level difference (Rδc) in a roughness curve, representing a difference between the cut level at the 25% load length ratio in the roughness curve and the cut level at a 75% load length ratio in the roughness curve.

The first side surface and the second side surface preferably have a lower arithmetic mean roughness (Ra) in the roughness curve than the bottom surface.

Note that the cut level difference (Rδc) and the arithmetic mean roughness (Ra) can be measured in accordance with JIS B 0601-2001 using a laser microscope (manufactured by Keyence Corporation, an ultra-deep color 3D shape measurement microscope (VK-X1000 or successor models thereof)). As the measurement conditions, a cutoff value λs is zero, a cutoff value λc is 0.08 mm, and the measurement range per spot is 1404 μm×1053 μm from the first side surface, the second side surface, and the bottom surface to be measured, and, for each measurement range, four lines to be measured may be drawn along the longitudinal direction so as to be substantially at equal intervals. Then, the line roughness measurement is performed on a total of 12 lines to be measured.

At least one, preferably both, of the cylinder 1 and the plunger 11 are made of a ceramic. As a result, the plunger pump 20 with high accuracy, high rigidity, high wear resistance, and high corrosion resistance is produced. Furthermore, the use of a ceramic, unlike a metal or the like, makes the surface during processing unlikely to develop protrusions or gain burrs due to processing, whereby the plunger pump 20 with high accuracy can be produced. Note that the ceramic contains, for example, aluminum oxide, zirconium oxide, silicon carbide, silicon nitride, zirconia toughened alumina (ZTA), and the like, as a main component.

In particular, the use of a ceramic containing aluminum oxide as a main component (hereinafter, also referred to as aluminum oxide ceramic) can produce the plunger pump 20 with higher accuracy, higher rigidity, higher wear resistance, and higher corrosion resistance. Here, the aluminum oxide ceramic refers to a ceramic with a content of Al in terms of $Al_2O_3$ of 90% by mass or more, with respect to all the components constituting the ceramic being 100% by mass.

The cylinder 1 and the plunger 11 made of aluminum oxide ceramic include calcium, and the content of calcium in terms of an oxide is preferably 0.04% by mass or less. In this manner, the content of calcium in terms of an oxide of 0.04% by mass or less achieves excellent corrosion resistance against citric acid disinfectant solutions (disinfectant solutions using hot water to which citric acid is added), which are often used for cleaning and disinfecting the cylinder 1 and the plunger 11. Thus, the plunger pump 20 according to the present disclosure can maintain the pumping function for an extended period of time. Note that, in addition to calcium, silicon and magnesium may be included.

Here, whether the cylinder or the plunger is made of aluminum oxide ceramic is first confirmed by measuring the presence of $Al_2O_3$ using an X-ray diffraction apparatus using CuKα lines. Next, the content of Al is determined using, for example, an inductively coupled plasma (ICP) emission spectroscopy device or a fluorescent X-ray analyzer (XRF). The measurement for Al is converted to $Al_2O_3$ and it is confirmed whether Al in terms of $Al_2O_3$ is less than 90% by mass or 90% by mass or more. Regarding calcium as well, the content of Ca can be determined using ICP or XRF, and by converting the measurement for calcium to CaO, the content of calcium in terms of an oxide thereof can be determined. Note that ICP or XRF may be used to determine the contents of the components other than Al, the measurements thereof are converted to respective oxides, and the value obtained by subtracting the converted values from 100% by mass may be regarded as the content of $Al_2O_3$.

The use of a ceramic containing zirconium oxide as a main component (hereinafter, also referred to as zirconium oxide ceramic) can produce the plunger pump 20 with higher accuracy, higher toughness, higher wear resistance, and higher corrosion resistance. Here, the zirconium oxide ceramic refers to a ceramic with a content of Zr in terms of $ZrO_2$ of 80% by mass or more, with respect to all the components constituting the ceramic being 100% by mass.

Furthermore, the zirconium oxide ceramic may contain yttrium with a content in terms of $Y_2O_3$ of preferably from 2 to 5 mol %. The zirconium oxide ceramic containing 2 to 5 mol % of yttria is stabilized, and thus has increased mechanical strength and is less likely to break.

The zirconium oxide ceramic may include 10 to 40 mol % of monoclinic zirconium oxide crystals. When the proportion of monoclinic zirconium oxide crystals is within the above-described range, even if heat is supplied, the zirconium oxide ceramic is less likely to undergo phase transformation and volume change due to this phase transformation. Thus, even after repeated heating and cooling, the cylinder or the plunger made of zirconium oxide ceramic is less susceptible to degradation of mechanical properties such as strength.

Here, the proportion of monoclinic zirconia crystals in the zirconium oxide ceramic can be expressed as a monoclinic fraction. The monoclinic fraction X is calculated based on the area of each peak intensity I of the zirconium oxide crystals obtained from the measurement results using the X-ray diffraction apparatus from the following formula.

$$X=(Im(111)+Im(11\text{-}1))/(Im(111)+Im(11\text{-}1)+It(111)+Ic(111))$$

In the formula, Im(111) is the peak intensity on the monoclinic (111) plane, Im(11-1) is the peak intensity on the monoclinic (11-1) plane, It(111) is the peak intensity on the tetragonal (111) plane, and Ic(111) is the peak intensity on the cubic (111) plane.

The average grain size of the crystal grains of the ceramic may be 3 μm or less (except for 0 μm). When the average grain size of the crystal grains of the ceramic is within this range, there are fewer abnormally grown crystal grains and degranulation of these crystal grains decreases, thus, contamination due to degranulation can be suppressed. In addition, due to decreased degranulation, the degree of freedom in processing for forming the shapes of the cylinder 1 and the plunger 11 is increased (fewer restrictions).

For the measurement of the average grain size and the maximum grain size of the crystal grains of the ceramic, first, diamond abrasive particles with an average grain size $D_{50}$ of 3 μm are used for polishing with a copper grinder. Thereafter, diamond abrasive particles with an average grain size $D_{50}$ of 0.5 μm are used for polishing with a tin grinder. The polished surface obtained by these processes of polishing is heat-treated at a temperature 50° C. to 100° C. lower than the firing temperature until the crystal grains and the grain boundary phase become distinguishable. The heat treatment is performed for approximately 30 minutes, for example. When the ceramic constituting the cylinder or the plunger is an aluminum oxide ceramic or a zirconium oxide ceramic, the temperature of the heat treatment is, for example, 1300° C. to 1650° C.

Then, images of the heat-treated surface are captured using a scanning electron microscope (SEM) with a magnification of 10000 and a range to be measured with a length in the lateral direction of 12 μm and a length in the longitudinal direction of 9 μm, for example. Next, the measurement range is set from the captured images, and the average grain size and the maximum grain size can be determined by analysis using image analysis software (for example, Win ROOF, manufactured by Mitani Corporation). For analysis, with a grain size threshold set to 0.21 μm, grains with a grain size less than 0.21 μm are not included in the calculation of the average grain size and the maximum grain size.

Next, an example of a manufacturing method of the plunger pump 20 according to the present embodiment will be described. First, to produce a ceramic containing aluminum oxide as a main component, aluminum oxide powder (purity 99.9% by mass or more) and powders of magnesium hydroxide, silicon oxide, and calcium carbonate are fed into a pulverizing mill together with a solvent (ion exchanged water). After pulverization until the powder average grain size ($D_{50}$) becomes 1.5 μm or less, an organic binder and a dispersing agent for dispersing the aluminum oxide powder are added and mixed to obtain a slurry.

Here, out of a total of 100% by mass of the powders, the content of the magnesium hydroxide powder is 0.43 to 0.53% by mass, the content of the silicon oxide powder is 0.039 to 0.041% by mass, the content of the calcium carbonate powder is 0.020 to 0.071% by mass, and the balance is aluminum oxide powder and unavoidable impurities.

Examples of the organic binder include acrylic emulsions, polyvinyl alcohol, polyethylene glycol, polyethylene oxide, and the like.

Next, the slurry is spray-granulated to produce granules which are then pressed under a molding pressure of 78 MPa or more and 128 MPa or less using a hydrostatic press molding apparatus to produce a cylindrical molded body to be the cylinder 1 and a columnar molded body to be the plunger 11.

Note that the cylinder 1 may have a bottomed cylindrical shape or a cylindrical shape having a separate bottom connected thereto. The cylinder 1 may be a bottomed tubular body or a tubular body having a separate bottom portion connected thereto. The separate bottom portion may be made of ceramic or a material other than a ceramic. For example, the use of a member such as polytetrafluoroethylene (PTFE) achieves high corrosion resistance and easy processability.

Next, the inner circumferential surface of the molded body to be the cylinder 1 is cut to form the helical groove 3. Prepared holes to be the first through hole and the second through hole are formed by cutting from the outer circumferential surface toward the inner circumferential surface of the molded body after firing. If necessary, a prepared hole to be the third through hole may be formed by cutting after firing. The outer circumferential surface of the front end portion of the molded body to be the plunger 11 is cut to form the notch portion 14.

Next, after the cutting, the molded bodies are fired at a firing temperature of 1500° C. or more and 1650° C. or less for a holding time of 4 hours or more and 6 hours or less to produce sintered bodies.

To produce the cylinder 1 and the plunger 11 having an average grain size of ceramic crystal grains of 3 μm or less, the molding pressure is set to 118 MPa or more and 128 MPa or less and the firing temperature is set to 1500° C. or more and 1550° C. or less.

Next, to produce a ceramic containing zirconium oxide as a main component, zirconium oxide powder serving as the main component, yttrium oxide powder serving as a stabilizer, and, as necessary, a dispersing agent for dispersing the zirconium oxide powder and a binder such as polyvinyl alcohol are wet blended in a barrel mill, a rotary mill, a vibration mill, a bead mill, a sand mill, an agitator mill, or the like for 40 to 50 hours to form a slurry. The content of the yttrium oxide powder in a total of 100% by mass of the zirconium oxide powder and the yttrium oxide powder is 3.6% by mass or more and 8.8% by mass or less.

Here, the average grain size (D50) of the zirconium oxide powder is 0.1 μm or more and 2.2 μm or less.

Next, a predetermined amount of an organic binder such as paraffin wax, polyvinyl alcohol (PVA), and polyethylene glycol (PEG) is weighed and added to the slurry. In addition, a thickening stabilizer, a dispersing agent, a pH adjusting agent, an antifoam agent, and the like may be added.

Next, the slurry is spray-dried to produce granules which are pressed under a molding pressure of, for example, 80 MPa or more and 200 MPa or less using a hydrostatic pressing apparatus to produce a cylindrical molded body to be the cylinder 1 and a columnar molded body to be the plunger 11.

The cutting may be performed in the same manner as described above.

After the cutting, the molded bodies are fired at a firing temperature of 1400° C. or more and 1700° C. or less, preferably 1600° C. or more and 1700° C. or less, for a holding time of 1 hour or more and 3 hours or less to produce sintered bodies.

To produce a ceramic containing 10 to 40 mol % of monoclinic zirconium oxide crystals, after the molded bodies are produced using the method described above, the molded bodies are held at a firing temperature of 1600° C. or more and 1700° C. or less for 1 hour or more and 3 hours or less and then cooled at a temperature decrease rate of 80° C. or more and 150° C. or less per hour.

Next, using a centerless grinder, the inner circumferential surface of the cylinder 1 and the outer circumferential surface of the plunger 11 of the sintered bodies are ground with a grinding wheel equipped with diamond abrasive particles having a particle size of #360 or more and #1200 or less. Here, the particle size is in accordance with JIS R6001-2: 2017. After polishing the sintered bodies, the circumferential groove 4 is obtained by grinding.

Even if the helical groove 3 is formed before the heat treatment as described above, the grinding wheel does not fall into the helical groove 3 during grinding of the inner circumferential surface of the cylinder. Thus, processing can be highly efficiently and highly accurately performed.

Note that while the circumferential groove 4 that communicates with the helical groove 3 is provided on the inner circumferential surface of the cylinder 1 in the present embodiment, instead of the circumferential groove 4, a circumferential groove that is configured to communicate with the helical groove 3 and that extends over the entire circumference in the circumferential direction of the cylinder may be provided on the outer circumferential surface of the plunger 11. Here, the phrase "configured to communicate with the helical groove 3" means that the circumferential groove communicates with the helical groove 3 at any position in a range in which the plunger 11 makes a rotary reciprocating motion with respect to the cylinder 1. In such a case, the fluid can enter the circumferential groove from the helical groove 3, and the fluid can be held.

Second Embodiment

A plunger pump according to a second embodiment of the present disclosure will be described based on FIGS. 4(*a*), and 4(*b*1) to 4(*b*3). In the following description, members that are the same as those in the first embodiment are denoted by the same reference signs, and descriptions thereof will be omitted.

In a plunger pump 21 according to the present embodiment, a cylinder 1' has the intake port 2*a* and the discharge port 2*b*, similar to the above. On the other hand, the plunger 11' includes a notch portion 14, and a helical groove 12 (first groove portion) is formed on the outer circumferential surface, and a circumferential groove 13 (second groove portion) that communicates with the helical groove 12 is formed on a rear end of the helical groove 12.

The helical groove 12 has a length that forms a half turn, i.e. 180°, on the outer circumferential surface of the plunger 11'. The front end of the helical groove 12 is in the same position as a rear end 14*a* of the notch portion 14 on the opposite side to the notch portion 14 of the plunger 11' in the present embodiment, but may be more toward the front end side.

The helical groove 12 may make a single turn or more on the outer circumferential surface of the plunger 11', and preferably makes a ⅓ turn or more and two turns or less.

In the present embodiment, the helical groove 12 is not in constant communication with the intake port 2*a* and the discharge port 2*b* of the cylinder 1', but is in sequential communication with the intake port 2*a* and the discharge port 2*b* by the rotary reciprocating motion of the plunger 11'. In this communication state, the fluid enters the helical groove 12 and is further stored in the circumferential groove 13, whereby it is possible to prevent fluid loss and adherence of fluid in the gap (sliding surface) between the cylinder 1' and the plunger 11'.

Other configurations are similar to the embodiments described above.

Note that while the circumferential groove 13 that communicates with the helical groove 12 is provided on the outer circumferential surface of the plunger 11' in the present embodiment, instead of the circumferential groove 13, a circumferential groove that is configured to communicate with the helical groove 12 and that extends around the entire circumference in the circumferential direction of the cylinder may be provided on the inner circumferential surface of the cylinder 1'. Here, the phrase "configured to communicate with the helical groove 12" means that the circumferential groove communicates with the helical groove 12 at any position in a range in which the plunger 11 makes a rotary reciprocating motion with respect to the cylinder 1'. In such a case, the fluid can enter the circumferential groove from the helical groove 12, and the fluid can be held.

Third Embodiment

Figure 5:
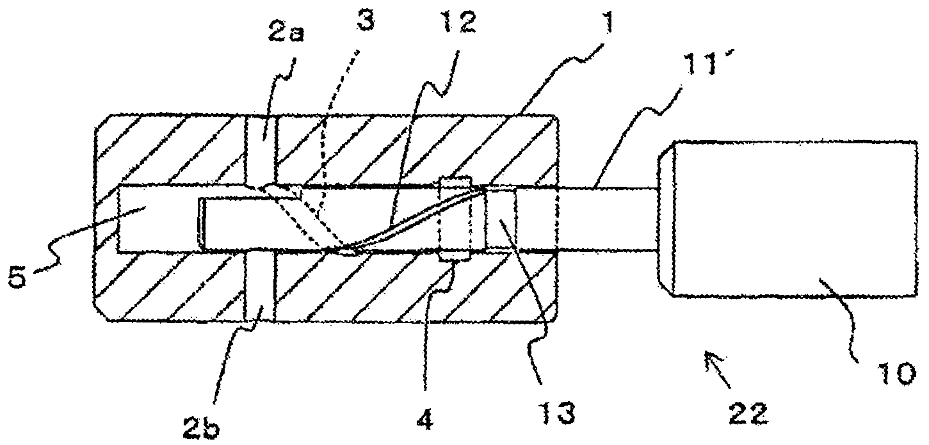
FIG. 5 is a longitudinal sectional view of a plunger pump according to a third embodiment of the present disclosure.

A plunger pump according to a third embodiment of the present disclosure will be described based on FIG. 5. In the following description, members that are the same as those in the first embodiment and the second embodiment are denoted by the same reference signs, and descriptions thereof will be omitted.

Figure 4:
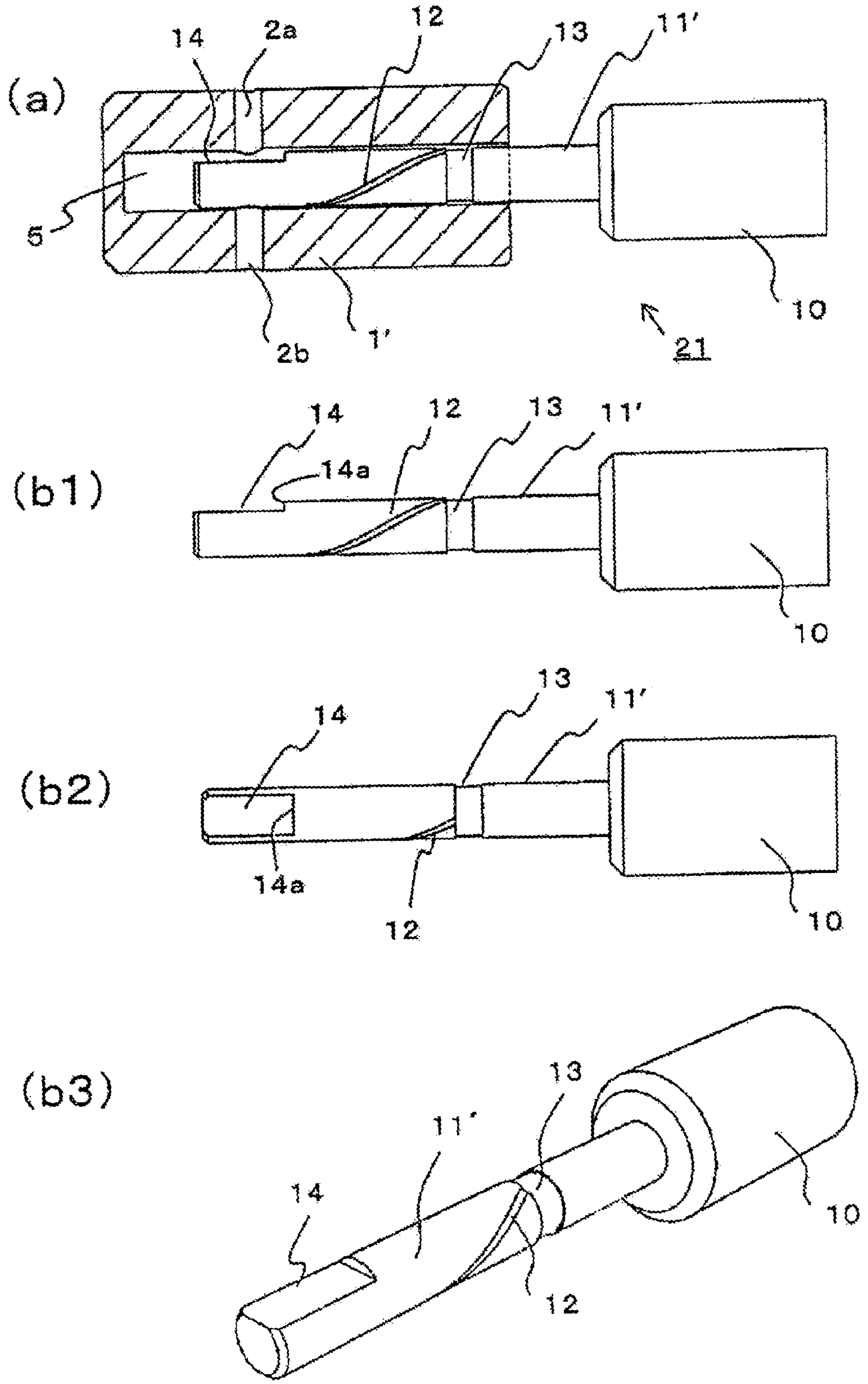
FIG. 4(*a*) is a longitudinal sectional view of a plunger pump according to a second embodiment of the present disclosure, FIG. 4(*b*1) is a side view of a plunger, FIG. 4(*b*2) is a side view of the plunger rotated 90° from the state in FIG. 4(*b*1), and FIG. 4(*b*3) is a perspective view of the plunger.

A plunger pump 22 according to the present embodiment includes the cylinder 1 in the first embodiment (see FIGS. 3(*a*) and 3(*b*)) and the plunger 11' in the second embodiment (see FIGS. 4(*b*1) to 4(*b*3)) that inserts into the cylinder chamber 5 of the cylinder 1.

In the present embodiment, the helical grooves 3, 12 are respectively formed in the inner circumferential surface of the cylinder 1 and the outer circumferential surface of the plunger 11', and, furthermore, the circumferential grooves 4, 13 are formed. As a result, the amount of fluid supplied to the gap between the cylinder 1 and the plunger 11' is increased, making this configuration more effective in preventing adherence. Other configurations are similar to the embodiments described above.

Fourth Embodiment

A plunger pump according to a fourth embodiment of the present disclosure will be described based on FIGS. 6(*a*) and 6(*b*). In the following description, members that are the same as those in the aforementioned embodiments are denoted by the same reference signs, and descriptions thereof will be omitted.

Figure 6:
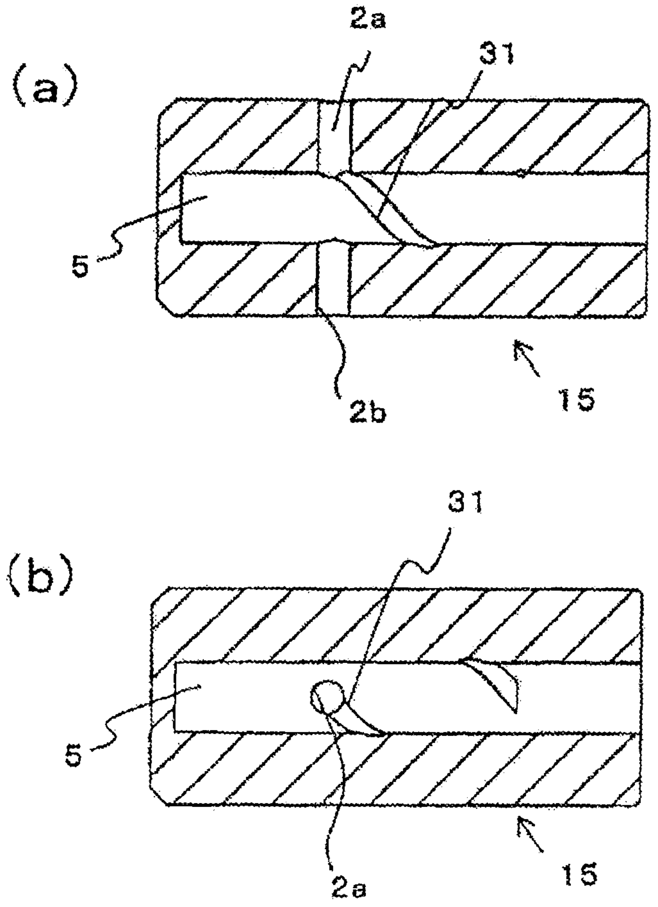
FIG. 6(*a*) is a longitudinal sectional view of a cylinder according to a fourth embodiment of the present disclosure, and FIG. 6(*b*) is a longitudinal sectional view of the cylinder rotated 90° from the state in FIG. 6(*a*).

FIG. 6(*a*) is a longitudinal sectional view of a cylinder 15 according to the present embodiment, and FIG. 6(*b*) is a longitudinal sectional view of the cylinder 15 rotated 90° from the state in FIG. 6(*a*). As illustrated in FIGS. 6(*a*) and 6(*b*), only a helical groove 31 (first groove portion) having a front end communicating with the intake port 2*a* and extending from the intake port 2*a* toward the rear end side is provided on the inner circumferential surface of the cylinder 15, and the circumferential groove 4 according to the first embodiment is not formed.

In this way, even if only the helical groove 31 is provided, since the fluid enters the helical groove 31 from the intake port 2*a*, drying and adherence of fluid in the gap between the cylinder 15 and the plunger 20 or 21 can be suppressed. Other configurations are similar to the embodiments described above.

Fifth Embodiment

A plunger pump according to a fifth embodiment of the present disclosure will be described based on FIGS. 7(*a*) and 7(*b*). In the following description, members that are the same as those in the aforementioned embodiments are denoted by the same reference signs, and descriptions thereof will be omitted.

Figure 7:
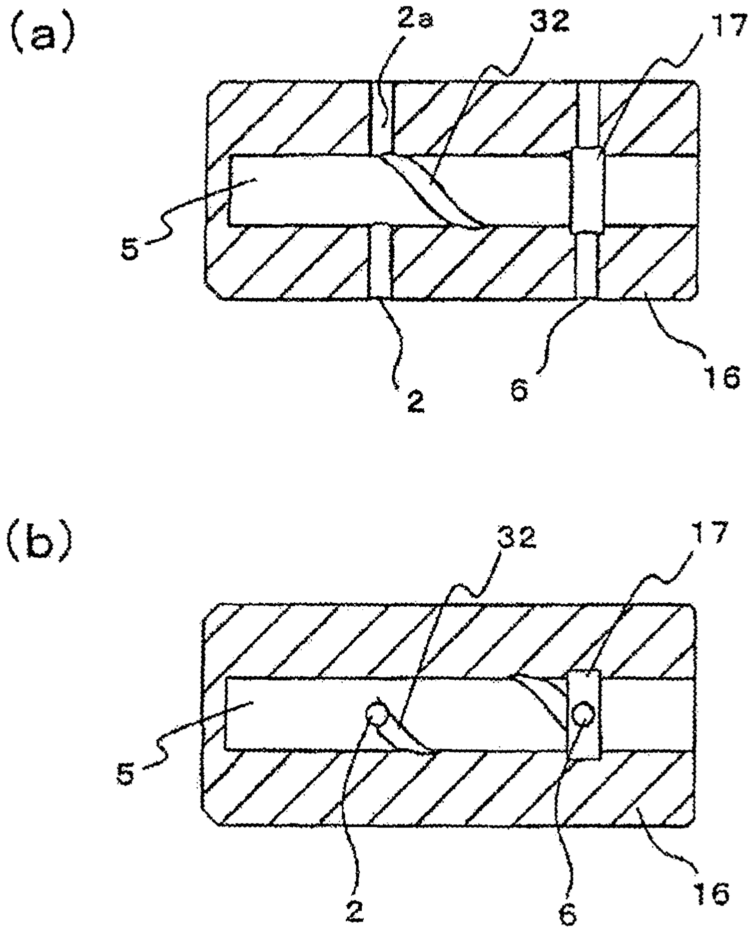
FIG. 7(*a*) is a longitudinal sectional view of a cylinder according to a fifth embodiment of the present disclosure, and FIG. 7(*b*) is a longitudinal sectional view of the cylinder rotated 90° from the state in FIG. 7(*a*).

FIG. 7(*a*) is a longitudinal sectional view of a cylinder 16 according to the present embodiment, and FIG. 7(*b*) is a longitudinal sectional view of the cylinder 16 rotated 90° from the state in FIG. 7(*a*). As illustrated in FIGS. 7(*a*) and 7(*b*), the cylinder 16 has an inner circumferential surface provided with a helical groove 32 (first groove portion) that has a front end communicating with the intake port 2*a* and extends from the intake port 2*a* toward the rear end side. The rear end of the helical groove 32 communicates with a circumferential groove 17 (second groove portion).

The circumferential groove 17 communicates with a through hole 6 that reaches the inner circumferential surface from the outer circumferential surface of the cylinder 16. As a result, a cleanser other than the fluid being used can be introduced through the through hole 6.

Note that, without forming the circumferential groove 17, the through hole 6 may directly communicate with the helical groove 32 at any position in the longitudinal direction thereof. Other configurations are similar to the embodiments described above.

The inner circumferential surface on which the through hole 6 is formed may be a fired surface. If the inner circumferential surface is a fired surface, since there is no crushed layer as a result of polishing or grinding, degranulation is less likely to occur even when high pressure fluid flows therethrough.

In addition, even in a case where the plunger 11' is provided with the helical groove 12 and the circumferential groove 13 as in the second embodiment, a through hole 6 as described above may be provided in the cylinder 1' to enable communication through the circumferential groove 13 or directly with the helical groove 12.

Sixth Embodiment

Figure 8:
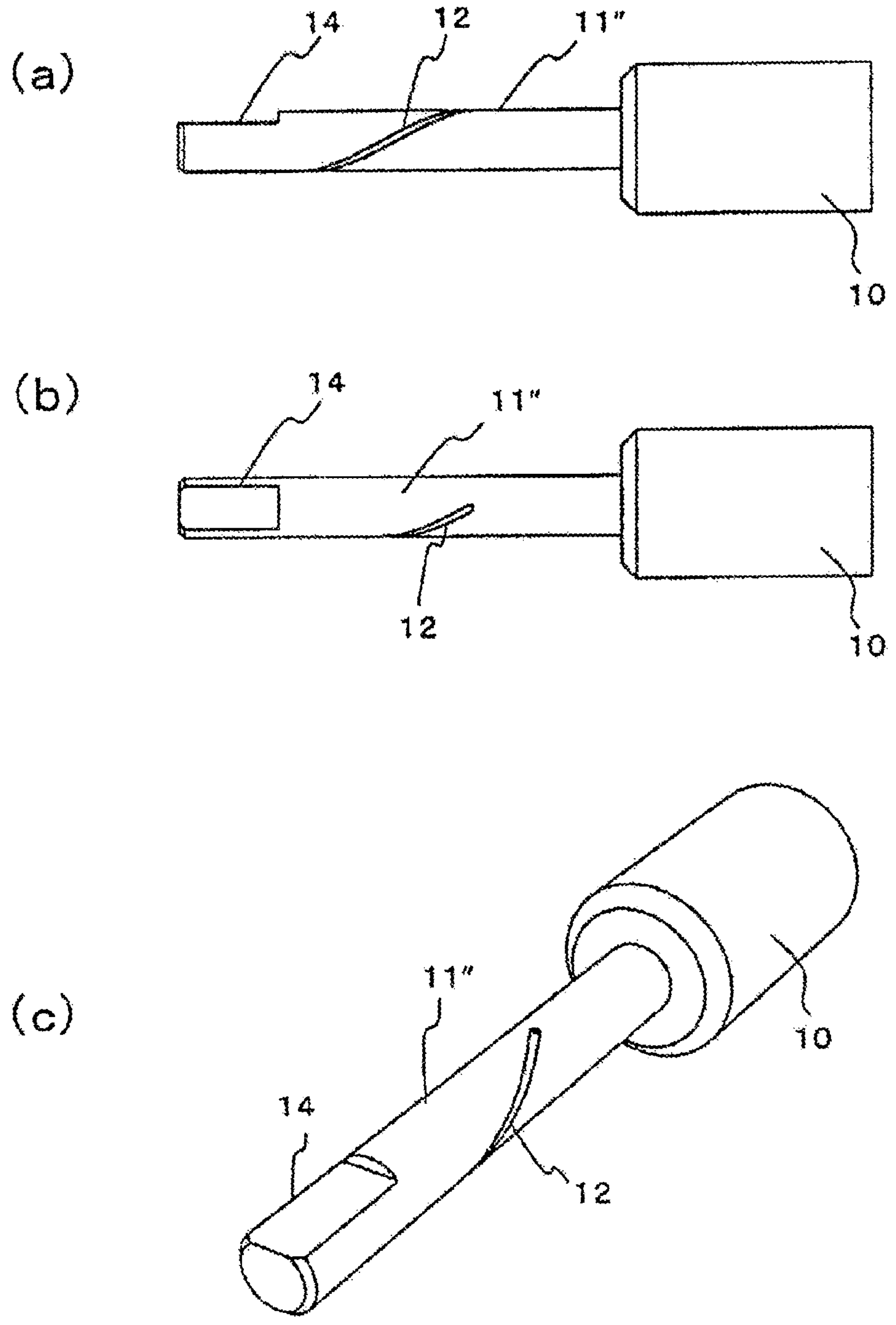
FIG. 8(*a*) is a side view of the plunger according to the fifth embodiment of the present disclosure, FIG. 8(*b*) is a side view of the plunger rotated 90° from the state in FIG. 8(*a*), and FIG. 8(*c*) is a perspective view of the plunger.

A plunger pump according to a sixth embodiment of the present disclosure will be described based on FIGS. 8(*a*) to 8(*c*). In the following description, members that are the same as those in the aforementioned embodiments are denoted by the same reference signs, and descriptions thereof will be omitted.

A plunger 11" in the present embodiment differs from the second embodiment in that, while the plunger 11" has the helical groove 12 on the outer circumferential surface like the plunger 11' in the second embodiment, the plunger 11" does not have the circumferential groove 13 at the rear end of the helical groove 12. Even with such an aspect, the fluid can enter the space between the cylinder 1 or 1' and the plunger 11" through the helical groove 12, whereby drying and adherence of fluid can be suppressed. Other configurations are similar to the embodiments described above.

As described above, by providing a helical groove on the inner circumferential surface of the cylinder and/or the outer circumferential surface of the plunger, the plunger pump according to the present disclosure can suppress drying and adherence of fluid such as a dialysate. A liquid is mainly used as the fluid, but a gas may be used instead.

Seventh Embodiment

A plunger pump according to a seventh embodiment of the present disclosure will be described based on FIGS. 9 and 10.

Figure 9:
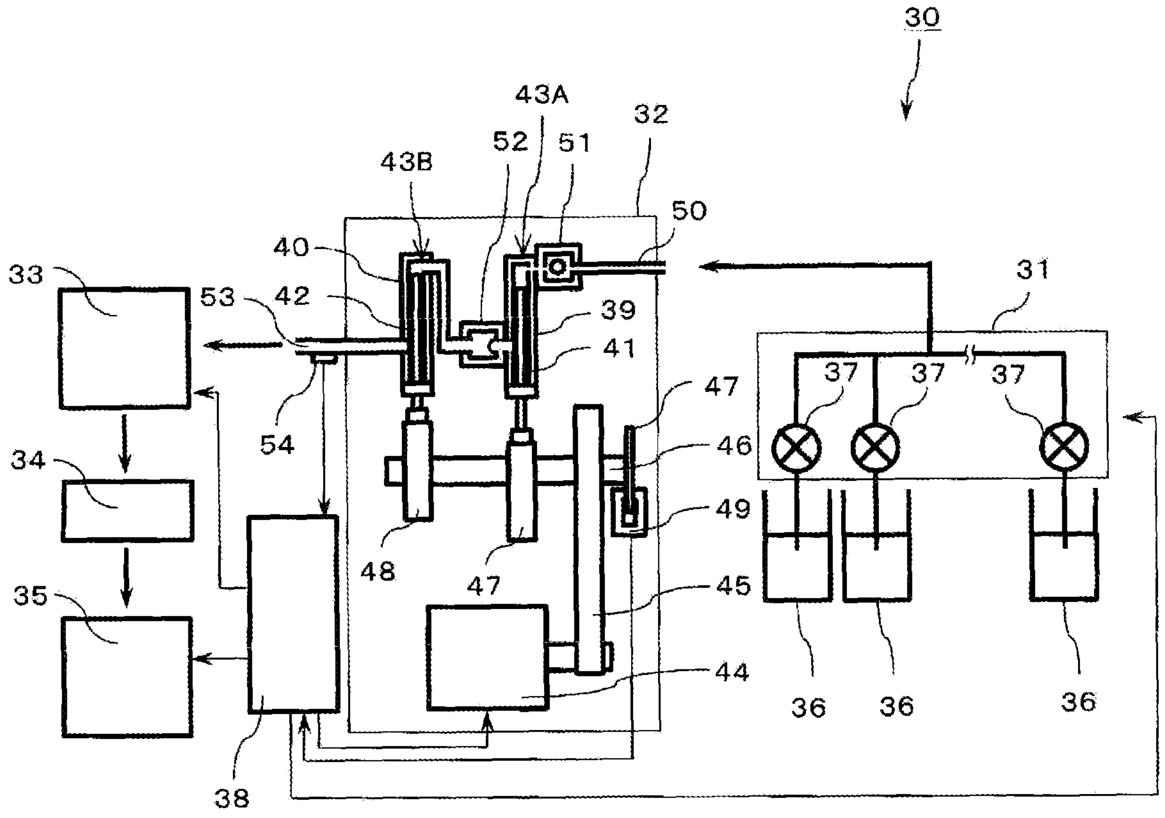
FIG. 9 is a schematic diagram illustrating a schematic configuration of a low-pressure gradient method of liquid chromatography device according to a seventh embodiment of the present disclosure.

FIG. 9 is a schematic diagram illustrating a schematic configuration of low-pressure gradient liquid chromatography device.

Liquid chromatography device 30 illustrated in FIG. 9 includes a switching device 31 that selects a plurality of solvents for dissolving a sample to be analyzed, a liquid feeding device 32 that sucks the selected plurality of solvents through a suction port, mixes the solvents between the suction port and a discharge port, and feeds the resultant liquid from the discharge port to a sample injection device 33, the sample injection device 33 that injects the sample to be analyzed into the fed solvents, a separation column 34 that separates the sample injected into the solvents fed by the sample injection device 33 into components, and a detector 35 that detects the components of the sample separated in the separation column 34.

Solvents having different compositions are contained in respective containers 36, appropriate solvents are selected by the switching device 31 depending on the sample to be analyzed, and are suctioned by the liquid feeding device 32 and fed to the sample injection device 33. The switching device 31 includes switching valves 37, and the amounts and mixing ratio of the solvents can be changed by changing the opening degrees and timings of the switching valves 37.

The sample to be analyzed is injected into the fed solvents by the sample injection device 33. The injected sample is separated into components in the separation column 34, where each of the components is sent to the detector 35 with a time difference to be detected.

Control of the flow rates of the solvents fed from the liquid feeding device 32, control of the opening degrees of the switching valves 37, control of the timing of the sample injection by the sample injection device 33, and the reception of operating commands and detection data of the detector 35 are performed by a control device 38.

The liquid feeding device 32 includes: plunger pumps 43A, 43B including cylinders 39, 40 having cylinder chambers, and a first through hole and a second through hole that open from the inner circumferential surface toward the outer circumferential surface of the cylinder chambers, and plungers 41, 42 inserted in the cylinder chambers and configured to make a reciprocating motion with respect to the cylinder chambers; and a driver (motor) 44 that causes the plungers 41, 42 to make a reciprocating motion. In the example illustrated in FIG. 9, the cylinder 39 is a first cylinder, and the cylinder 40 is a second cylinder. The plunger 41 is a first plunger, and the plunger 42 is a second plunger.

The rotation motion of the motor 44 is transmitted by a belt 45 to a camshaft 46, whereby the first cam 47 causes a reciprocating motion of the first plunger 41, and the second cam 48 causes a reciprocating motion of the second plunger 42. The rotational speed of the camshaft 46 is measured by a slit disc 47 mounted on the camshaft 46 rotating together with the camshaft 46, and a rotation sensor 49 detecting the slit using an optical method, capacitance method, magnetic field lines, or the like.

When the solvents in the containers 36 are sucked into the liquid feeding device 32 through an intake path 50, a check valve 51 opens first, then the first plunger 41 moves downward in FIG. 9 to start the suction of the solvents. When the cylinder chamber of the first cylinder 39 is filled with the solvents, the first plunger 41 moves upward in FIG. 9 to start a pushing operation. In this process, the check valve 51 is closed and a check valve 52 opens, the second plunger 42 performs a suction operation in synchronization with the pushing operation of the first plunger 41, whereby the cylinder chamber of the second cylinder 40 is filled with the solvents. Next, when the pushing operation of the second plunger 42 is started, the check valve 52 closes and the solvents in the cylinder chamber of the second cylinder 40 are fed to the sample injection device 33 through a delivery path 53.

The delivery path 53 is a pipe, and a pressure sensor 54 is provided that measures the pressure inside the pipe. The measured value of the pressure inside the pipe is sent to the control device 38. The value of the rotational speed of the camshaft 46 is measured by the rotation sensor 49 and sent to the control device 38. Based on these two values, the control device 38 controls the rotational speed of the motor 44. Furthermore, in the gradient method, in which the mixing ratio of the plurality of solvents is gradually changed over time, the control device 38 performs control while changing the opening timings and the opening degrees of the switching valves 37 corresponding to the solvents as appropriate.

FIG. 10 is a longitudinal sectional view of the plunger pump 43A illustrated in FIG. 9.

The reciprocating motion of the first plunger 41 causes the solvents to be sucked from the first through hole (intake port) 55 and discharged from the second through hole (discharge port) 56. The inner circumferential surface of the first cylinder 39 is provided with a helical first groove portion 57 that communicates with at least one of the first through hole (intake port) 55 and the second through hole (discharge port) 56. With such a configuration, the adherence and deposition of the plurality of solvents due to crystallization are suppressed, and the mixing of the solvents is promoted while the solvents are being suctioned and discharged. By adopting the same structure for the plunger pump 43B, the adherence and deposition of the plurality of solvents due to crystallization can be suppressed, and the mixing of the solvents can be promoted.

Preferred embodiments of the present disclosure have been described above, but the present disclosure is not limited to the embodiments described above, and various modifications and changes can be made within the range set forth in the scope of claims.

REFERENCE SIGNS LIST

1, 1' Cylinder
2*a* Intake port (first through hole)
2*b* Discharge port (second through hole)
3 Helical groove (first groove portion)
4 Circumferential groove (second groove portion)
5 Cylinder chamber
6 Through hole
10 Attachment portion
11, 11', 11" Plunger
12 Helical groove (first groove portion)
13 Circumferential groove (second groove portion)
14 Notch portion
15, 16 Cylinder
17 Circumferential groove (second groove portion)
20, 21, 22 Plunger pump
30 Liquid chromatography device
31 Switching device
32 Liquid feeding device
33 Sample injection device
34 Separation column
35 Detector
36 Container
37 Switching valve
38 Control device
39, 40 Cylinder
41, 42 Plunger
43A, 43B Plunger pump
44 Motor
45 Belt
46 Camshaft
47 First cam
48 Second cam
49 Rotation sensor
50 Intake path
51, 52 Check valve
53 Delivery path
54 Pressure sensor
55 Intake hole (first through hole)
56 Discharge port (second through hole)
100 Cylinder
101 Plunger
102 Intake port
103 Discharge port
104 Notch portion

The invention claimed is:

1. A plunger pump comprising:

a cylinder having a cylinder chamber, and a first through hole and a second through hole that open from an inner circumferential surface of the cylinder chamber toward an outer circumferential surface of the cylinder chamber; and a plunger inserted in the cylinder chamber and configured to make a reciprocating motion with respect to the cylinder chamber, wherein an inner circumferential portion of the cylinder has the inner circumferential surface of the cylinder chamber, and a helical first groove portion on the inner circumferential surface, the helical first groove portion being configured to communicate with at least one of the first through hole and the second through hole, the inner circumferential surface of the cylinder chamber has a second groove portion communicating with the first groove portion and extending over an entire circumference of the cylinder in a circumferential direction of the cylinder, and the second groove portion comprises a first side surface and a second side surface opposite to the first side surface, and a bottom surface connecting the first side surface and the second side surface, and a maximum grain size of crystal grains on the first side surface and the second side surface is smaller than a maximum grain size of crystal grains on the bottom surface.

2. The plunger pump according to claim 1, wherein the inner circumferential surface on which at least one of the first through hole, the second through hole, or the first groove portion is formed is a fired surface.

3. The plunger pump according to claim 1, wherein the cylinder has a third through hole communicating with the first groove portion.

4. The plunger pump according to claim 3, wherein an inner circumferential surface of the third through hole is a fired surface.

5. A liquid feeding device comprising:

the plunger pump described in claim 1; and a driver configured to cause the plunger in the plunger pump to make the reciprocating motion.

6. A plunger pump comprising:

a cylinder having a cylinder chamber, and a first through hole and a second through hole that open on an inner circumferential surface of the cylinder chamber and an outer circumferential surface of the cylinder chamber; and a plunger that has a front end portion with an outer circumferential surface provided with a notch portion, that is inserted in the cylinder chamber, and that is configured to make a reciprocating motion with respect to the cylinder chamber, wherein an outer circumferential portion of the plunger has the outer circumferential surface of the plunger, and a helical first groove portion is formed on the outer circumferential surface of the plunger, the helical first groove portion being configured to communicate with at least one of the first through hole and the second through hole, the outer circumferential surface of the plunger has a second groove portion communicating with the first groove portion and extending over an entire circumference of the plunger in a circumferential direction of the plunger, and the second groove portion comprises a first side surface and a second side surface opposite to the first side surface and a bottom surface connecting the first side surface and the second side surface, and a maximum grain size of crystal grains on the first side surface and the second side surface is smaller than a maximum grain size of crystal grains on the bottom surface.

7. The plunger pump according to claim 6, wherein the inner circumferential surface on which at least one of the first through hole, the second through hole, and the first groove portion is formed is a fired surface.

8. The plunger pump according to claim 6, wherein the cylinder has a third through hole configured to communicate with the first groove portion.

9. The plunger pump according to claim 8, wherein an inner circumferential surface of the third through hole is a fired surface.

10. The plunger pump according to claim 6, wherein
the cylinder and the plunger are made of a ceramic, and
the ceramic comprises aluminum oxide as a main component and calcium with a content in terms of an oxide CaO of 0.04% by mass or less.

11. The plunger pump according to claim 6, wherein the cylinder and the plunger are made of a ceramic, the ceramic comprises zirconium oxide as a main component and yttrium with a content in terms of Y203 of 2 to 5 mol %.

12. The plunger pump according to claim 11, wherein
the ceramic comprises 10 to 40 mol % of monoclinic zirconium oxide crystals.

13. A plunger pump comprising:
a cylinder having a cylinder chamber, and a first through hole and a second through hole that open from an inner circumferential surface of the cylinder chamber toward an outer circumferential surface of the cylinder chamber; and
a plunger inserted in the cylinder chamber and configured to make a reciprocating motion with respect to the cylinder chamber, wherein
an inner circumferential portion of the cylinder has the inner circumferential surface of the cylinder chamber, and a helical first groove portion on the inner circumferential surface, the helical first groove portion being configured to communicate with at least one of the first through hole and the second through hole,
an outer circumferential surface of the plunger has a second groove portion configured to communicate with the first groove portion and extending over an entire circumference of the plunger in a circumferential direction of the cylinder, and
the second groove portion comprises a first side surface and a second side surface opposite to the first side surface, and a bottom surface connecting the first side surface and the second side surface, and a maximum grain size of crystal grains on the first side surface and the second side surface is smaller than a maximum grain size of crystal grains on the bottom surface.

14. The plunger pump according to claim 13, wherein
the inner circumferential surface on which at least one of the first through hole, the second through hole, and the first groove portion is formed is a fired surface.

15. A plunger pump comprising:
a cylinder having a cylinder chamber, and a first through hole and a second through hole that open on an inner circumferential surface of the cylinder chamber and an outer circumferential surface of the cylinder chamber; and
a plunger that has a front end portion with an outer circumferential surface provided with a notch portion, that is inserted in the cylinder chamber, and that is configured to make a reciprocating motion with respect to the cylinder chamber, wherein
an outer circumferential portion of the plunger has the outer circumferential surface of the plunger, and a helical first groove portion is formed on the outer circumferential surface of the plunger, the helical first groove portion being configured to communicate with at least one of the first through hole and the second through hole,
the inner circumferential surface of the cylinder chamber has a second groove portion configured to communicate with the first groove portion and extending over an entire circumference of the cylinder in a circumferential direction of the cylinder, and
the second groove portion comprises a first side surface and a second side surface opposite to the first side surface and a bottom surface connecting the first side surface and the second side surface, and a maximum grain size of crystal grains on the first side surface and the second side surface is smaller than a maximum grain size of crystal grains on the bottom surface.

16. The plunger pump according to claim 15, wherein
the inner circumferential surface on which at least one of the first through hole, the second through hole, and the first groove portion is formed is a fired surface.

* * * * *